Oct. 26, 1965

D. E. WRIGHT 3,213,545

LEVEL WITH MAGNETIC WORKING SURFACE

Filed Dec. 21, 1961

INVENTOR.
DONALD E. WRIGHT
BY John W. Michael
ATTORNEY

Oct. 26, 1965 D. E. WRIGHT 3,213,545
LEVEL WITH MAGNETIC WORKING SURFACE
Filed Dec. 21, 1961 3 Sheets-Sheet 2
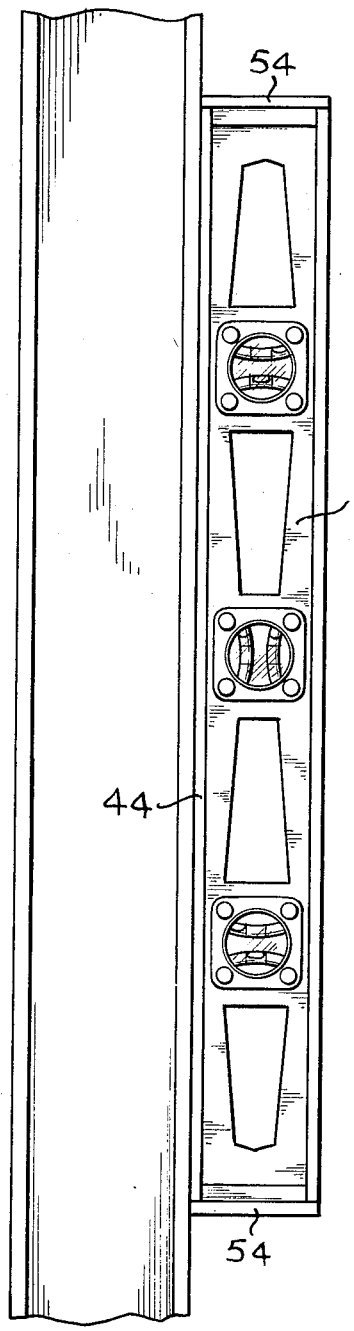
FIG. 4
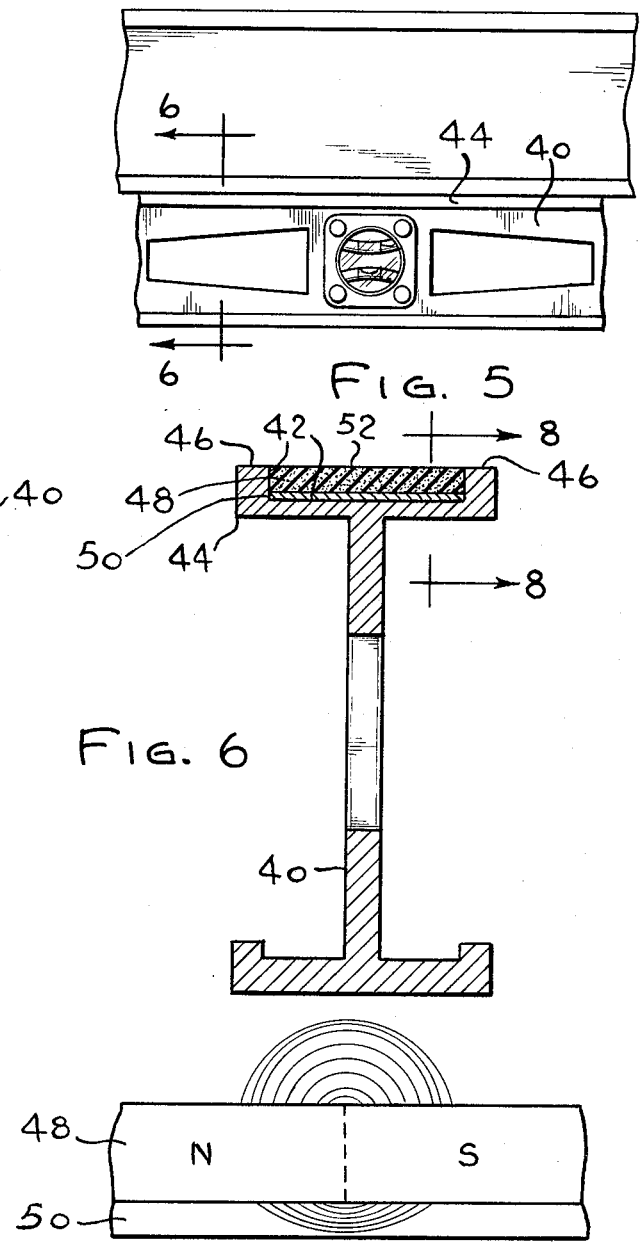
FIG. 5
FIG. 6
FIG. 8
INVENTOR.
DONALD E. WRIGHT
BY
ATTORNEY Oct. 26, 1965
D. E. WRIGHT
3,213,545
LEVEL WITH MAGNETIC WORKING SURFACE
Filed Dec. 21, 1961
3 Sheets-Sheet 3
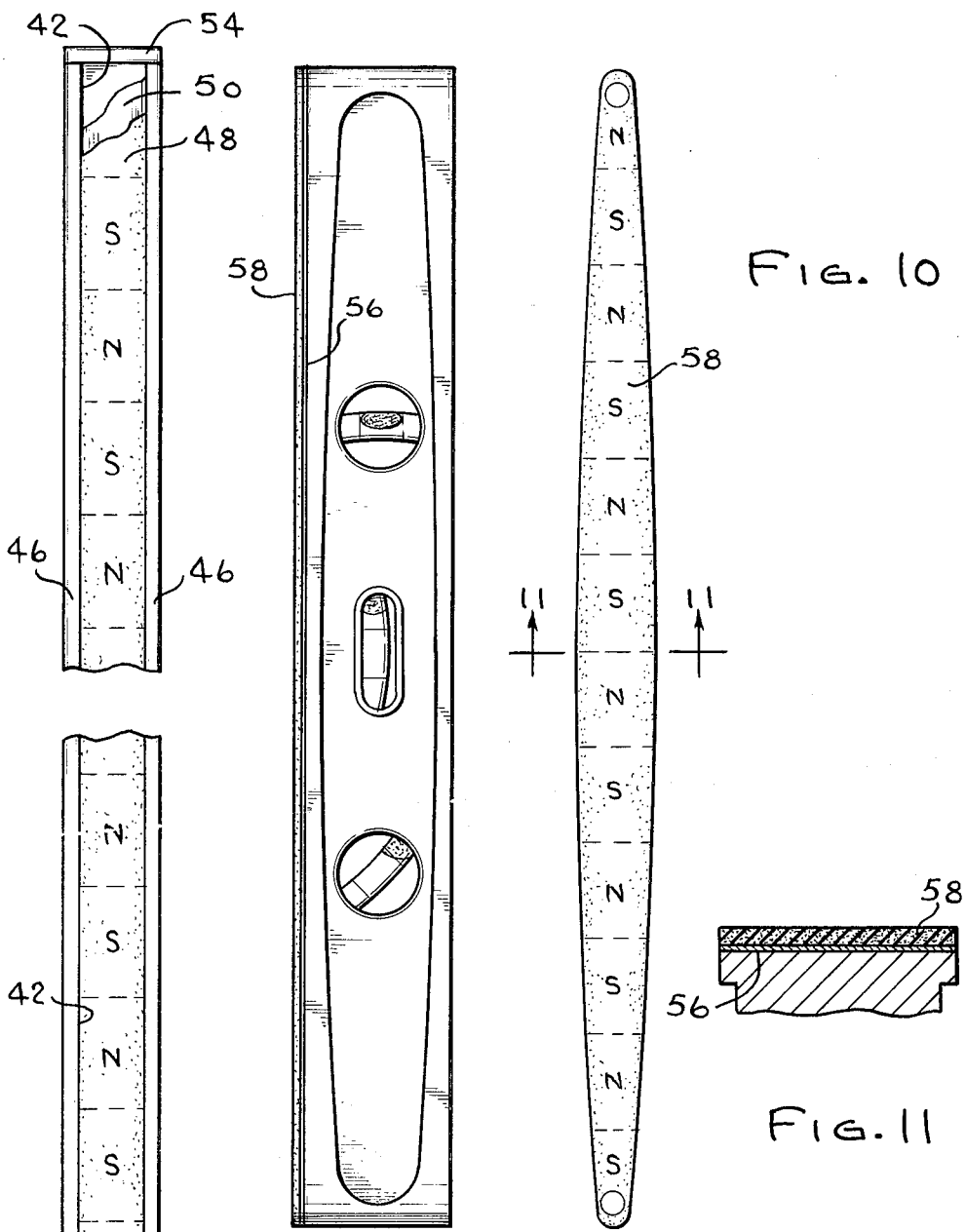
INVENTOR.
DONALD E. WRIGHT
BY
John W. Michael
ATTORNEY

United States Patent Office 3,213,545
Patented Oct. 26, 1965

3,213,545
LEVEL WITH MAGNETIC WORKING SURFACE
Donald E. Wright, Elm Grove, Wis. (% Empire Level Mfg. Co., 10930 W. Potter Road, Milwaukee 13, Wis.)
Filed Dec. 21, 1961, Ser. No. 161,224
4 Claims. (Cl. 33—207)

This application is a continuation-in-part of my former application for a Level With Magnetic Working Surface, Serial No. 36,930, filed June 17, 1960, now abandoned.

This invention relates to spirit levels and particularly to an improved level frame which incorporates magnetic means for holding the level securely on a ferromagnetic member thus permitting the worker's hands to be free when leveling and assembling metal parts and also relates to the method of assembling such a spirit level.

It is desirable in the construction of a magnetic level that the magnet holding means retain the level on a metal support without tipping the level on the side or otherwise moving it from the normal working position. To provide these functions without impairing the accuracy or substantially increasing either the size or the weight of the level or requiring non-standard shape frames has presented a problem.

It is an object of this invention, therefore, to provide a magnetic level which is light, accurate, compact, of relatively simple construction, and which can be retained firmly on a ferromagnetic surface while in normal working position and will remain permanently magnetized for the life of the level.

Another object is to provide a magnetic level wherein the permanenly magnetized portion: is incorporated in a frame of standard shape; is protected from wear and shock; and is effective uniformly over the entire length of the level to insure proper holding action even if one end of the level extends over the edge of the metal surface.

A further object of this invention is to provide a magnetic level wherein optimum holding force is derived.

A still further object of this invention is to provide a relatively simple, facile, economical and yet effective method of assembling a magnetic spirit level.

The objects of this invention are provided by a spirit level having a conventionally appearing frame with a permanently magnetized strip mounted on the frame and extending longitudinally continuously along the entire length of at least one working surface thereof. The magnetic strip is made from a resilient base material having permanently magnetized particles embedded therein. In one embodiment, the strip is installed on the frame by pressing it into a channel-like cavity in and extending the length of one working surface. The exposed surface of the strip is flush with such working surface so that when such working surface is seated on the face of a ferromagnetic member such as a pipe, structural steel member, or the like, there will be a good magnetic path formed and the level will be held firmly in place as the member is adjusted to proper position. By using a single magnetic strip, the magnetic force of which extends unbrokenly continuously along the entire length of the working surface of the level, the holding power is greatly increased and will hold the level in place even when a part of the level extends beyond the ferromagnetic member. By inlaying the strip in a working face of the level the magnetic strip material is protected from shock and abrasion in use and no substantial modification of the standard configuration for a spirit level is required.

In accordance with a further aspect of this invention, it is proposed to provide a magnetizable member adjacent the permanent magnetic strip which is operative to complete the magnetic circuit for the magnetic strip thereby concentrating the magnetic flux and markedly increasing the holding force of the magnetic strip. The magnetic strip and the energy magnetizable member form a laminated assembly supported on the level. The assembly of the level can be accomplished by either attaching the member to the level frame and then attaching the permanent magnetic strip to the magnetizable member or by attaching the magnetizable member to the permanent magnetic strip and then attaching this laminated assembly to the level frame. Whichever method is used the permanent magnetic strip is in an unmagnetized state during assembly and any machining operations and then, subsequently, is magnetized.

Other objects and advantages will be pointed out in, or be apparent from the specification and claims, as will obvious modifications of the embodiments shown in the drawings, in which:

FIG. 4 is a side view of an additional embodiment of the invention and held in a vertical position;

FIG. 5 is a fragmentary view of that embodiment held in a horizontal position;

FIG. 6 is a sectional view taken along line 6—6 of FIG. 5;

FIG. 7 is a plan view of the embodiment of FIG. 4;

FIG. 8 is a sectional view taken along line 8—8 of FIG. 6;

FIG. 9 is a side elevation of still an additional embodiment of this invention;

FIG. 10 is a plan view of that embodiment; and

FIG. 11 is a sectional view taken along line 11—11 of FIG. 10.

Figure 1:
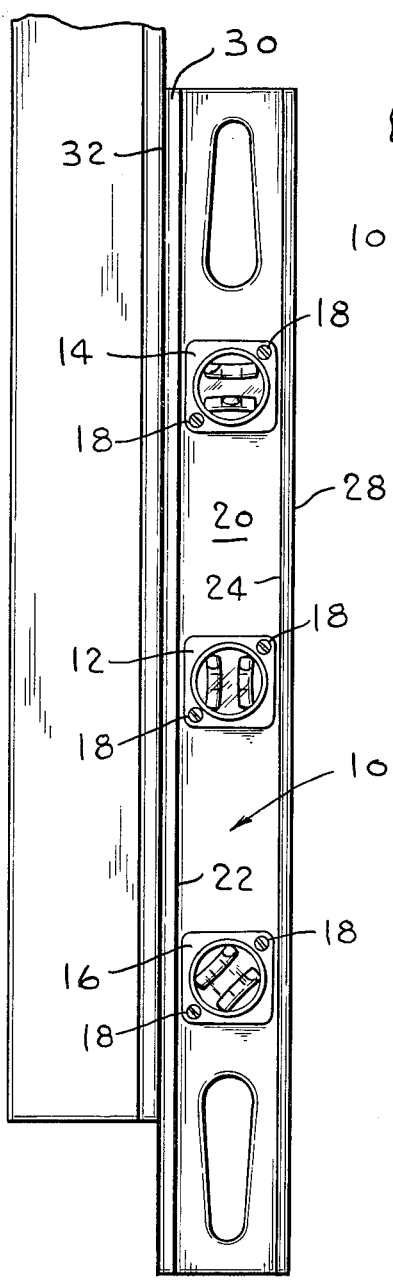
FIG. 1 is a side view of a spirit level embodying the invention and held in vertical position to a structural steel member.

Referring to the drawings in detail, FIG. 1 shows a spirit level having a frame 10 of standard shape and conventional vial assemblies 12, 14 and 16 mounted thereon by screws 18. Assemblies 12, 14 and 16 includes two level vials, two plumb vials and two 45-degree vials, respectively. The vial assemblies may be of any suitable design such as that disclosed in United States Patent No. 2,810,206, dated October 22, 1957.

The frame 10 may be of any suitable material such as wood or metal. Preferably, the frame is made from extruded aluminum which provides a strong, light weight, non-corrosive construction.

Figure 3:
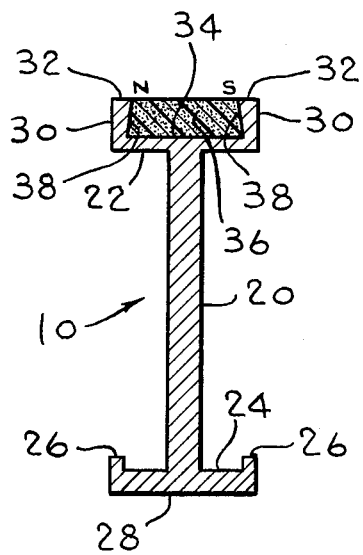
FIG. 3 is a sectional view taken along line 3—3 of FIG. 2.

As shown in FIG. 3, the extruded aluminum frame 10 is of substantially conventional I-beam shape having a web 20 and end flanges 22 and 24. Flange 24 is provided with inwardly extending lips 26, 26 coextensive with the flanges which serve to strengthen the structure. The face or working surface 28 of flange 24 is milled to provide an accurately dimensioned reference plane for the level when used as a conventional non-magnetic frame level. Flange 22 is provided with a pair of outwardly extending lips 30, 30 lengthwise coextensive with the flange to form a channel-like cavity or recess 34. These lips cause no substantial change in the general appearance of the otherwise standard level. The outer end of the lips are milled to form working surfaces 32, 32 which form another reference plane for the level when used as a magnetic level.

A flexible non-brittle, non-breakable magnetic strip 36 is seated and secured in the recess 34. Preferably, magnetic strip 36 comprises a body of resilient material in which finely divided particles of permanently magnetized material are closely uniformly distributed and orientated.

Various specific types of magnetic strip material can be used. It has been found, however, that a product produced by the B. F. Goodrich Company and available commerically as Koroseal flexible magnetic strip provides very good results as does a product of the Leyman Corporation, Magnetic Division, available commercially as Plastiform. Koroseal has a large permanence indicated by the demagnetizing force ($H_c$) or coerceive force of substantially 1150 oersteds and is the preferred material for strip 36. The specific properties and characteristics of Koroseal magnetic strip are described in detail in B. F. Goodrich Information Bulletin Index 10,000. Bulletin No. 1059–63, dated April 20, 1959. Such magnetic strip material is available in several north and south magnetic pole arrangements. A preferred pole arrangement for strip 36 is that shown in FIG. 3 wherein the poles (indicated by the letters N and S) extend continuously longitudinally on the face of the strip along opposite edges of such face.

Strip 36 is installed on frame 10 by pressing it into channel 34 and adhered therein by any siutable bonding cement such as that avaliable commercially under the name Pliobond. As shown in FIG. 3, the edges of strip 36 and the inner walls of lips 30, 30 may be provided with a matching taper as at 38 to more securely hold the strip in the cavity once it is installed. After strip 36 has been installed, the milled working surfaces 32 on flange 22 and the exposed face of the strip are ground flush. This assures a good magnetic path between the magnetic strip 36 and such ferromagnetic member against which the level is placed. Of importance is the fact that the strip being resilient will conform to slight projections on such member and make a good magnetic path and the fact that the strip being non-brittle will not break when struck or when the level is dropped. As may be seen from FIG. 3 (also FIG. 6) the area of the permanent magnetic strip which constitutes part of the area of the working surface of the level is over 70% of the total area of the working surface. The good contact and relatively large area establishes strong attractive and holding force and excellent stability of the level when placed on the work to be leveled.

While only a single magnetic strip 36 is provided on the level shown in the drawings and described above, it should be understood that such a strip could be installed on both flanges of the level frame if desired.

From the foregoing it is seen that the provision of a single magnetic strip extending continuously along and flush with the entire working surface of the level provides a strong and uniform magnetic holding force without modifying the accepted and desired standardized configuration for a spirit level. If the end portion of the level were to extend slightly beyond the member to be plumbed as in FIG. 1, the operation of the level will not be impaired and the magnetic holding force will be sufficient to hold the level to the support. Furthermore, it should be appreciated that by inlaying magnetic strip 36 in the working face of the level, the strip is protected from shock and abrasion by lips 30. Thus, magnetic levels embodying this invention offer new freedom of action to electricians, plumbers, structural steel and metal workers of all kinds, promoting safety and cutting time.

Figure 2:
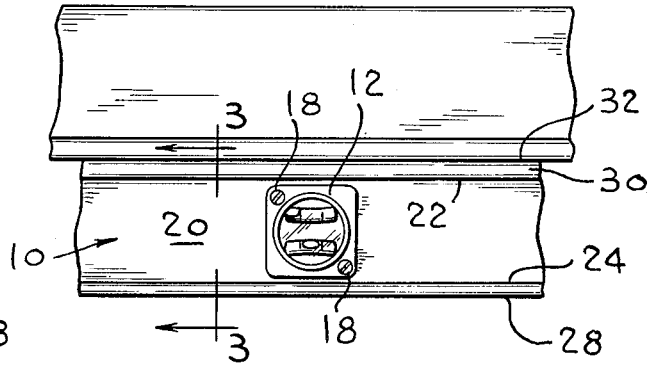
FIG. 2 is a fragmentary side view of such level held in a horizontal position to the lower surface of a steel structural member.

Turning now to the alternative embodiment illustrated in FIGS. 4–8, the spirit level disclosed therein can be identical in construction to the spirit level previously discussed and again, although it can be made from any suitable material, it is preferably made of aluminum. This spirit level includes a frame 40 having a channel-shaped end 44 which includes a longitudinally extending recess 42 and working surfaces 46, 46. An elongated magnetic strip 48 is positioned in recess 44 atop a coextensively extending member 50. A suitable adhesive is used to attach member 50 to the frame and strip 48 to member 50, for example, for example transfer tapes available commercially from Minnesota Mining and Manufacturing Co. and known as 465 tape and 466 tape, respectively. If desired, the longitudinally extending opposed walls of recess 42 and edges of strip 48 and member 50 can be provided with a matching taper (not shown), as was disclosed in the embodiment of FIGS. 1–3.

Magnetic strip 48 can be made of either of the two above-discussed materials, but in this embodiment, is preferably made of Plastiform for reasons which will appear herinafter. The specific properties of Plastiform are disclosed in a bulletin entitled "Leyman Plastiform Permanent Magnets" available from the Leyman Corporation, Magnetic Division, of Cincinnati, Ohio. Strip 48 is preferably so magnetized that it will have north and south magnetic poles alternating along its longitudinal axis, but it should be understood that any desired pole arrangement can be used.

In the preferred method of assembling this embodiment, member 50 is attached to the frame in recess 42 by a suitable adhesive, transfer tape 456, and then magnetic strip 48 is attached to member 50 by an adhesive, transfer tape 466. As an alternative to this procedure member 50 can be attached to strip 48 and then the resulting laminated assembly attached to the frame within recess 42. After the magnetic strip and member 48 have been assembled in recess 42 the upper working surface of the level is suitably machined to insure parallel working surfaces for the level and, correspondingly, the accuracy of the level, i.e. the upper surface 52 of strip 48 and working surfaces 46 are milled flush so as to provide opposed parallel working surfaces for the level. The frame, including the magnetic strip and member 50, is now placed in a suitable fixture and exposed to a condenser-type magnetizer to produce alternating north and south magnetic poles along the longitudinal axis of the level.

Member 50 is positioned opposite to the work engaging face 52 of magnetic setrip 48 and is made from magnetizable material, such as Armco steel. Member 50 becomes a part of the magnetic circuit for magnetic strip 48 and, in one sense, provides a low reluctance path for the magnetic flux producing a greater concentration of magnetic flux in the air gap along the work engaging face 52 between adjacent north and south poles and resulting in an increase in holding power of the magnetic strip. The magnetizable member 50 acts as a shunt for the magnetic flux path between adjacent north and south poles on the inner face of the magnetic strip 48 to thus increase the attractive and holding powers of the magnetic fields between the opposite poles on the work engaging face. In other words the bar type magnets extending from face to face of the magnetic strip are converted into substantially U-shaped or C-shaped magnets with a consequent increase in the overall tractive force. More particularly, the combined thickness of strip 48 and member 50 can be approximately 40% of that of the magnetic strip of the embodiment of FIGS. 1–3, with strip 48 itself being approximately 33% of that thickness, and yet the combination of strip 48 and member 50 results in a 15% increase in holding power. Plastiform is particularly well suited for use in this enbodiment because it is available in calendered strips or sheets of desired thickness. It will be appreciated that this provides a more economical level while actually improving the operating characteristics thereof. It will also be noted that with the particular positioning of magnetic strip 48 and magnetizable member 50 the advantage from the inclusion of the magnetizable member is realized while retaining the advantage of providing optimum holding power by using the magnetic strip as part of the working surface of the level.

If desired, end pieces 54, 54 can be included at the opposed ends of recess 42 to provide still further protection for magnetic strip 48 and member 50.

A still further embodiment of this invention is illustrated in FIGS. 9–11, which also includes a magnetizable magnetic member 56, such as Armco steel, and a Plastiform magnetic strip 58 attached to magnetic member 56. It will be noted that here strip 58 provides one of the working surfaces for the level and preferably includes alternating north and south magnetic poles along the longitudinal axis of the level. This construction is desirable for smaller size levels, however, it should be understood that it could be used for larger levels and similarly the construction previously discussed could be used for smaller levels. This embodiment can also be assembled in the manner disclosed above.

Although the present invention has been illustrated and described in connection with particular preferred embodiments thereof, it will be apparent to those skilled in the art that various changes and modifications may be made therein without departing from the scope of the invention or from the scope of the appended claims.

What I claim is:

1. A level with magnetic securing means comprising:
    a level frame providing a flat working surface the area of which is coextensive with the length and width of said frame to provide adequate support for the level;
    a level indicator vial assembly mounted in said frame;
    a strip of permanently magnetized resilient material secured to said frame and having a flat exposed surface which constitutes over 50% of the area of said working surface;
    said strip being characterized by having north and south pole faces substantially coextensive with the entire area of said flat exposed surface;
    a magnetizable member interposed between said frame and said strip; and
    said magnetizable member being secured directly to the inner face of said strip to provide a shunt for the magnet flux path between adjacent north and south poles on the inner face of said strip to increase the overall attractive and holding powers of said strip.

2. A level according to claim 1 in which
    said strip is further characterized by having the north and south pole faces alternate along the length of said strip.

3. A level with magnetic securing means comprising:
    a level frame provided with a flat surface which defines a recess extending substantially the entire length of the frame;
    a strip of permanently magnetized resilient material mounted in its entirely in said recess and extending the length thereof, said strip having a flat exposed surface which is flush with said flat surface to define with said flat surface a flat working surface of the level;
    said flat exposed surface constituting over 50% of the area of said flat working surface;
    said flat working surface being coextensive with the length and width of said frame to provide adequate support for the level; and
    said strip being characterized by having north and south pole faces substantially coextensive with the entire area of said flat exposed surface.

4. A level according to claim 3 in which
    the edges of said strip and the walls of said recess are provided with a matching taper to aid in locking said strip in said recess.

References Cited by the Examiner

UNITED STATES PATENTS

| | | | |
|---|---|---|---|
| 28,104 | 5/60 | Nicholson | 33—211 |
| 697,594 | 4/02 | Alteneder | 33—104 |
| 2,133,605 | 10/38 | Wikstrom. | |
| 2,535,791 | 12/50 | Fluke. | |
| 2,907,992 | 10/59 | Bronikowski | 248—206 X |
| 2,959,832 | 11/60 | Baermann | 248—206 |

OTHER REFERENCES

B. F. Goodrich Information Bulletin Index 10,000, Bulletin No. 1059–63 April 20, 1959.

ISAAC LISANN, *Primary Examiner.*

ROBERT EVANS, *Examiner.*

UNITED STATES PATENT OFFICE
CERTIFICATE OF CORRECTION

Patent No. 3,213,545 October 26, 1965

Donald E. Wright

It is hereby certified that error appears in the above numbered patent requiring correction and that the said Letters Patent should read as corrected below.

Column 6, line 6, for "entirely" read -- entirety --.

Signed and sealed this 28th day of June 1966.

(SEAL)
Attest:

ERNEST W. SWIDER
Attesting Officer

EDWARD J. BRENNER
Commissioner of Patents